United States Patent [19]

Creasy et al.

[11] Patent Number: 4,642,267

[45] Date of Patent: Feb. 10, 1987

[54] HYDROPHILIC POLYMER BLEND

[75] Inventors: Walter S. Creasy, Bridgewater; Donald H. Lorenz, Basking Ridge; Robert G. LaCasse, North Plainfield, all of N.J.; Salvatore A. Malagreca, Staten Island, N.Y.

[73] Assignee: Hydromer, Inc., Whitehouse, N.J.

[21] Appl. No.: 731,111

[22] Filed: May 6, 1985

[51] Int. Cl.$^4$ .................. B32B 27/38; C08L 29/04
[52] U.S. Cl. .................. 428/413; 428/423.1; 428/423.3; 428/424.2; 428/425.8; 521/159; 521/172; 521/174; 521/141; 523/105; 524/507; 525/58; 525/125
[58] Field of Search .................. 525/125, 127, 937, 58; 523/105, 111; 524/507; 428/423.1, 425.8, 413; 521/172, 174, 141

[56] References Cited

U.S. PATENT DOCUMENTS

| | | |
|---|---|---|
| 3,412,054 | 11/1968 | Milligan et al. .................. 524/591 |
| 3,893,979 | 7/1975 | Wolf et al. .................. 260/77.5 AQ |
| 3,961,379 | 6/1976 | Highgate et al. .................. 525/937 X |
| 4,074,007 | 2/1978 | Gebauer et al. .................. 428/411 |
| 4,094,838 | 6/1978 | Schneider et al. .................. 106/252 |
| 4,100,309 | 7/1978 | Micklus et al. .................. 427/2 |
| 4,119,094 | 10/1978 | Micklus et al. .................. 428/36 X |
| 4,192,827 | 3/1980 | Mueller et al. .................. 525/123 |
| 4,229,551 | 10/1980 | Straub et al. .................. 525/337 |
| 4,254,239 | 3/1981 | Straub et al. .................. 525/123 |
| 4,347,338 | 8/1982 | Torii et al. .................. 525/123 |
| 4,350,791 | 9/1982 | Straub et al. .................. 525/123 |
| 4,373,009 | 2/1983 | Winn .................. 428/423.5 X |
| 4,408,026 | 10/1983 | Pusineri et al. .................. 525/128 |
| 4,467,073 | 8/1984 | Creasy .................. 525/127 |
| 4,472,467 | 9/1984 | Tamaki et al. .................. 427/444 |

OTHER PUBLICATIONS

Technical Bulletin 7583-003 of the General Aniline & Film Corporation entitled: "PVP/Polyvinylpyrrolidone/Physical Chemical, Physiological and Functional Properties."

Primary Examiner—Theodore E. Pertilla
Attorney, Agent, or Firm—Hoffmann, Dilworth, Barrese & Baron

[57] ABSTRACT

A hydrophilic polymer blend is disclosed which comprises a first polymer component which is an organic solvent-soluble, thermoplastic polyurethane and a second polymer component which is a hydrophilic poly(N-vinyl lactam), e.g., a water soluble polyvinylpyrrolidone. The blend demonstrates slipperiness is aqueous environments and, among other applications, is useful in low-friction coatings for a wide variety of substrates.

20 Claims, No Drawings

HYDROPHILIC POLYMER BLEND

BACKGROUND OF THE INVENTION

This invention relates to the field of polymer blends, or alloys, and more particularly, to hydrophilic blends of polyurethane and poly(N-vinyl lactam) and to the use of these blends in a variety of applications including the formulation of lubricious coating compositions.

There has long been a need in the art for lubricious materials which are non-slippery when dry but exhibit lubricious or slippery properties when contacted with aqueous fluids. Applications for such materials are numerous and diverse and include fabrication into surface coatings, foams, fibers, films, or solid articles which absorb water, impart wettability or reduce the coefficient of friction in aqueous environments. Uses include, but are not limited to, coatings for catheters, condoms, invasive devices and test probes which are lubricious only when wet, antifog coatings for lenses, windows, etc., drag reducing coatings for ships, burn and wound dressings, contact lenses, antistatic coatings, hydrophilic fibers and matrices for controlled release of pharmaceuticals, dyes, fragrances, salts and the like. It had previously been proposed to reduce the coefficients of friction of these and similar devices and materials by the use of non-permanent coatings of silicone or certain fluorocarbons, neither of which are hydrophilic, and which do not have as low coefficients of friction as are necessary or desirable for some applications. The fluorocarbon coatings also have the disadvantage of being difficult to handle because they are always slippery, not just when slipperiness is desired.

Coatings and articles useful for insertion into the body, for example, are described in U.S. Pat. Nos. 4,100,309 and 4,119,094. Articles such as catheters and condoms described in these patents are obtained by coating a suitable substrate with a polyvinylpyrrolidonepolyurethane interpolymer. The coatings are obtained by a two-step procedure using first a solution of isocyanate containing prepolymer and polyurethane followed by a solution of polyvinylpyrollidone. The isocyanate can be modified with chain extenders (diols, etc.) which effectively produce a linear thermoplastic polyurethane in situ. This preparative route yields coatings which are not of uniform composition throughout (two separate layers intermixed at the interface) and are not suitable for the preparation of integral articles, films, foams or matrices with regular and uniform physical and mechanical properties. In addition, the requirement that reactive isocyanates be present introduces unavoidable chemical instability (pot life) and eliminates the possibility of utilizing aqueous or alcoholic solvents for preparation. Isocyanates will also react with and inactivate many desirable additives such as pharmaceuticals, surfactants and dyes.

U.S. Pat. Nos. 4,373,009 and 4,472,467 describe similar composition which can in some cases be applied from a single solution. These patents, however, require a chemical reaction forming a covalent bond between isocyanates and active hydrogen groups reactive toward isocyanates on the vinyl lactam or ethylene oxide polymers to produce the objects of the invention. These patents actually teach away from the use of chemically inert components.

Other lubricious hydrophilic coatings for a variety of uses are described in the prior art. For example, the practice of forming a linear polyurethane polymer and then dispersing it in water is well known in the art as shown in U.S. Pat. Nos. 3,412,054 and 4,094,838 which describe the preparation of modified, water dispersible urethanes.

Polyvinylpyrrolidone, a commercially available poly(N-vinyl)lactam, is a well known hydrophilic, polymer having numerous applications including being a film former, protective colloid and suspending agent, dye-receptive resin, binder and stabilizer, physiologically acceptable polymer, etc. However, being water soluble, polyvinyl-pyrrolidone and related poly(N-vinyl)lactams will eventually be leached from coating compositions and other materials formulated with the polymer when contacted with aqueous fluids. Thus, the practical value of known compositions containing polyvinylpyrrolidone as lubricious coatings is greatly limited due to the erosion of their lubricious properties as the polyvinylpyrrolidone component dissolves or is leached into the surrounding aqueous medium. Technical Bulletin 7583-033 of General Aniline & Film Corporation describes a variety of films containing a solvent-blended mixture of polyvinylpyrrolidone and another polymer, i.e., vinylchloride-vinylacetate copolymer, polyethylene, polyacrylonitrile, vinylidene chloride polymer, polyvinylisobutyl ether, polyvinylethyl ether, polystyrene, polyvinylchloride and polyvinyl alcohol. No suggestion is made in the technical bulletin of a blend of polyvinylpyrrolidone and a polyurethane.

SUMMARY OF THE INVENTION

It has been discovered that organic solvent-soluble thermoplastic polyurethanes can be blended, or alloyed, with polyvinyl-pyrrolidone and/or other poly(N-vinyl lactams) either by the use of a common solvent or solvent mixture or conventional melt blending techniques. The resulting blends generally exhibit properties intermediate those of the polyurethane component and those of the poly(N-vinyl lactam) component, e.g. blends which readily absorb water to become soft and slippery (predominantly made up of the hydrophilic poly(N-vinyl lactam component) or blends which are relatively hard but still wettable (predominantly made up of the polyurethane component). In virtually all cases, blends containing a sufficient quantity of poly(N-vinyl lactam) to provide useful degrees of hydrophilicity will also exhibit significantly reduced coefficients of friction when wet.

In accordance with the present invention, a hydrophilic polymer blend is provided which comprises a first polymer component which is an organic solvent-soluble, thermoplastic polyurethane and a second polymer component which is a hydrophilic poly(N-vinyl lactam).

Unlike the procedure used for making the coatings of U.S. Pat. Nos. 4,100,309 and 4,119,094 which utilizes a solution of highly reactive isocynate, the polymer blend of this invention is prepared with a polyurethane, i.e., a preformed polymer having no reactive isocyanate groups, as such being stable in solution for indefinite periods of time. Accordingly, polymer blends herein can be readily formed at the point of application as needed simply by evaporating any solvent(s) with which they may be associated. This versatility makes the instant products especially convenient for use as coatings.

Contrary to what one would expect exposure of the blends of this invention to water, even for prolonged periods, does not result in any significant loss of the hydrophilic poly(N-vinyl lactam) component, possibly as a result of associative forces with the polyurethane component, chain entanglement, or both. Whatever may, in fact, be the basis for this property, the ability of the blends to retain their slippery properties when wet makes them highly useful as low friction coatings which will be in more or less constant or prolonged contact with aqueous fluids.

DESCRIPTION OF THE PREFERRED EMBODIMENT

Organic solvent-soluble, thermoplastic polyurethanes constitute a well known family of resins with extensive literature on the subject, e.g., that contained in the *Encyclopedia of Polymer Science and Technology*, Mark et al. (eds.), Wiley (1969) which is incorporated herein by reference. In general, such polyurethanes are prepared by the reaction of aromatic and/or aliphatic polyisocyanates with polyester and/or polyether polyols, or in the alternative, by the reaction of substantially linear, isocyanate-capped prepolymers with polyols of the aforestated type.

Useful polyisocyanates include toluene-2,4-diisocyanate, toluene-2,6-diisocyanate, commercial mixtures of toluene-2,4- and 2,6-diisocyanates, cyclohexylene-1,4-diisocyanate, m-phenylene diisocyanate, 3,3-diphenyl-4,4-biphenylene diisocyanate, 4,4-biphenylene diisocyanate, 1,6-hexamethylene diisocyanate, 1,5-naphthalene diisocyanate, cumene-2,4-diisocyanate, 2,4-diisocyanatodiphenylether, 5,6-dimethyl-1,3-phenylenediisocyanate, 2,4-dimethyl-1,3-phenylenediisocyanate, 2,4-dimethyl-1,3-phenylenediisocyanate, 4,4-diisocyanatodiphenylether, 9,10-anthracene diisocyanate, 2,4-diisocyanatotoluene, 1,4-anthracene diisocyanate, 2,4,6-toluene triisocyanate, isophorone diisocyanate and p,p',p",-triphenylmethane triisocyanate.

Preferred organic solvent-thermoplastic polyurethanes are polytetramethylene ether glycol-diphenylmethane diisocyanate (MDI), polytetramethylene ether glycol tolylene diisocyanate (TDI), polytetramethylene ether glycol-isoferrone isocyanate, poly(1,4-oxybutylene)glycoldiphenylmethane diisocyanate (MDI), poly(1,4-oxybutylene)glycoltolylene diisocyanate (TDI), poly(1,4-oxybutylene)glycolisoferrone isocyanate, polyethylene glycol-diphenylmethane diisocyanate (MDI), polyethylene glycol-tolylene diisocyanate (TDI), polyethylene glycol-isoferone isocyanate, polypropylene glycolidphenylmethane diisocyanate (MDI), polypropylene glycol-tolylene diisocyanate (TDI), polypropylene glycol-isoferrone isocyanate, polycaprolactone-diphenylmethane diisocyanate (MDI), polycaprolactone-tolylene diisocyanate (TDI), polycaprolactoneisoferrone isocyanate, polyethylene adipate-diphenylmethane diisocyanate (MDI), polyethylene adipate-tolylene diisocyanate (TDI), polyethylene adipate-isophorone isocyanate, polytetramethylene adipate-diphenylmethane diisocyanate (MDI), polytetramethylene adipate-tolylene diisocyanate (TDI), polytetramethylene adipate-isoferrone isocyanate, polyethylenepropylene adipate-diphenylmethane diisocyanate (MDI), polyethylene-propylene adipate-tolylene diisocyanate (TDI), and polyethylene-propylene adipate-isophorone isocyanate polyurethanes.

Although the useful polyurethanes are essentially linear in order to provide solubility and thermoplasticity, they can be crosslinked following blending with the poly(N-vinyl lactam) component, e.g., by adding a sufficient quantity of crosslinking agent to a solvent solution of the polymers or by incorporating the crosslinking agent into the melt-blended polymer mixture while it is still in the plastic state. Examples of crosslinking agents which can be utilized for this purpose are isocyanates, polycarboxylic acids, peroxide and organotitanates.

Useful polyester polyols include those obtained from the condensation of polycarboxylic acids, preferably dicarboxylic acids, such as adipic, sebacic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols, preferably diols, such as ethylene glycol, diethylene glycol, pentaglycol, glycerol, sorbitol, triethanolamine, di(beta-hydroxyethyl)ether, etc., and/or amino-alcohols such as ethanolamine, 3-aminopropanol, 4-aminopropanol, 5-aminopentanol- 1,6-aminohexanol, 10-aminodecanol, 6-amino-5-methyl-hexanol-1, p-hydroxymethylbenzylamine, etc. Polyesters derived from ring-opening/condensation of lactones with polyfunctional compounds such as any of the aforementioned polyalcohols can also be used in providing the organic solvent-soluble, thermoplastic polyurethane component of the subject polymer blends.

The term "poly(N-vinyl lactam)" as used herein shall be understood to include homopolymers and copolymers of such N-vinyl lactams as N-vinylpyrrolidone, N-vinylbutyrolactam, N-vinylcaprolactam, and the like, as well as the foregoing prepared with minor amounts, for example, up to about 20 weight percent, of one or a mixture of other vinyl monomers copolymerizable with the N-vinyl lactams. Of the poly(n-vinyl lactams), the polyvinyl-pyrrolidone (PVP) homopolymers are preferred. A variety of polyvinylpyrrolidones are commercially available from several sources and of these, a polyvinylpyrrolidone having a K-value of at least about 30 is especially preferred.

The polyurethane and poly(N-vinyl lactam) components of the blend can be combined employing conventional melt blending techniques and apparatus, e.g., a two-roll heated mill, helical screw extruder, etc., or, if desired the components can be combined by dissolving them in solvent which is subsequently evaporated to yield the blend. If the latter procedure is selected, the choice of solvent is important. Thus, the solvent must be capable of dissolving both polymer components in a single-phase solution and the relative volatilities must be such that at no point during evaporation and drying, the resulting mixture will tend to precipitate either polyurethane, poly(N-vinyl lactam) or an association complex of these polymers which may have different solubility characteristics than either material by itself. Solvents which are suitable include ethyl lactate, diacetone alcohol, methylene chloride, trichloroethylene, N-methyl pyrrolidone and mono and di-ethylene glycol ethers. Other solvents can be added to accelerate drying, reduce solvency toward particular substrates, etc., provided the aforestated conditions are met.

The blends of this invention can also be prepared from aqueous polyurethane dispersions where a coalescing solvent of lower volatility than water and/or electrostatic attraction from ionic species on dispersed macromolecules aids in compatibilizing the individual polymers during the final stages of drying. Examples of such a solvent include N-methyl(pyrollidone), dimethyl formamide, diacetone alcohol and various mono- and diethylene glycol esters.

The blends can contain from about 10 to about 80 weight percent, and preferably from about 25 to about 60 weight percent, of polyurethane, the balance being made up of the poly(N-vinyl lactam) component. Minor quantities, for example, up to about 20 weight percent, of one or a mixture of other compatible polymers can be incorporated into the blends, e.g., any of the polymers disclosed in General Aniline & Film Corporation Technical Bulletin 7583-033 referred to above.

The blends can be formed into a variety of shapes and, if desired, can be fabricated into foams employing known and conventional techniques including the use of chemical and/or physical blowing agents. The solid blends can also be extruded as fibers, rods, sheets, and so forth.

Many different types of additional materials can be incorporated into the polymer blends herein including organic and inorganic salts, alcohols, amines, acids, polymer latices, resin or wax dispersions, fillers, fibers, cellulosics, surfactants, pigments, dyes, enzymes, proteins, chelates, thickeners, stabilizers, dyes, fragrances, and so forth. The blends of this invention are especially useful as carriers for a wide variety of releasable materials including biologically active substances having curative or therapeutic value for human beings or non-human animals. Included among the biologically active materials which are suitable for incorporation into the blends of the present invention are: hypnotics, sedatives, tranquilizers, anti-convulsants, muscle relaxants, antiparkinson agents, analgesics, antipyretic agents, anti-inflammatory agents, local anasthetics, anti-spasmodics, antiulcer agents, antivirals, antibacterials, antifungals, antimalarials, sympathomimetic agents, cardiovascular agents, diuretics, antiparasitic agents, antitumor agents and hypoglycemic agents, and so forth.

In the form of a sheet or film or as a coating, the blends can be combined with and adhered to a virtually unlimited variety of substrates including metal and resin foils, woven and non-woven webs of natural and synthetic fibers, etc.

The following examples are further illustrative of the blends of this invention.

EXAMPLE 1

To a mixture of 75 g diacetone alcohol and 25 g methyl ethyl ketone is added 4 g polyvinylpyrrolidone (Kollidon 90, BASF Corp.) and 2 g linear polyurethane (Estane 5703, B. F. Goodrich Co.). The resulting solution when applied to such substrates as vinyl, epoxy and polyurethane resins and permitted to dry forms a highly durable coating which is slippery when wet (coefficient of friction 0.05). Continuous contact of the coated substrates with water for six months does not degrade the coating or diminish its lubricity to any appreciable extent.

EXAMPLE 2

To 47 g of water and 10 g N-methylpyrrolidone is added 10 g of polyvinylpyrrolidone (Kollidon 90, BASF Corp.) and 33 g of linear polyurethane aqueous dispersion (Neorez R940, Polyvinyl Chemical Industries). Films cast from the resulting viscous dispersion are lubricious when wet (coefficient of friction 0.08) and imbibe water forming elastic, transparent films useful as burn and wound dressings. The solution can also be used to spin fibers which are tough and elastic when wet and can be used to produce hydrophilic foams via either mechanical frothing or casting films with added acetone and drying with heat in vacuo.

EXAMPLE 3

Films cast as in Example 2 and containing 2% chlorohexidine acetate (w/w/ based on polymer) exhibited long acting bactericidal action against *Staph. aureus* in humid environments. Other substances which were successfully combined with the blends include cephalosporin, ampicillin, oxytetracycline, metaproterenol sulfate, salicylic acid and phenolphthalein.

What is claimed is:

1. A stable hydrophilic polymer blend which consists essentially of a first polymer component which is an organic solvent-soluble, preformed, thermoplastic polyurethane having no reactive isocynate groups and a second polymer component which is a hydrophilic poly (N-vinyl lactam), said blend capable of withstanding exposure to water without significant loss of said hydrophilic poly (N-vinyl lactam).

2. The polymer blend of claim 1 wherein the polyurethane is derived from an aromatic polyisocyanate and a polyether polyol.

3. The polymer blend of claim 1 wherein the polyurethane is derived from an aliphatic polyisocyanate and a polyether polyol.

4. The polymer blend of claim 1 wherein the polyurethane is derived from an aromatic polyisocyanate and a polyester polyol.

5. The polymer blend of claim 1 wherein the polyurethane is derived from an aliphatic polyisocyanate and a polyester polyol.

6. The polymer blend of claim 1 wherein the poly(N-vinyl lactam) is a water soluble polyvinylpyrrolidone homopolymer.

7. The polymer blend of claim 1 wherein the poly(N-vinyl lactam) is a poly(N-vinyl caprolactam) homopolymer.

8. The polymer blend of claim 1 containing at least one additional polymer component which is compatible therewith.

9. The polymer blend of claim 6 wherein the additional polymer component is a homopolymer or copolymer of at least one monomer selected from the group consisting of alpha-olefin, vinyl chloride, vinylidene chloride, hydroxyethylmethacrylate, acrylic acid, methacrylic acid, vinyl acetate, vinyl alcohol and vinyl ether.

10. The polymer blend of claim 1 in the form of a solid.

11. The polymer blend of claim 1 in the form of a foam.

12. A solvent solution of the polymer blend of claim 1.

13. A coating obtained from application of the solvent solution of claim 12 to a substrate followed by evaporation of the solvent.

14. A film or sheet prepared from the polymer blend of claim 1.

15. The polymer blend of claim 1 in which the polyurethane component is crosslinked during or subsequent to fabrication of the blend.

16. The polymer blend of claim 1 in which the poly(N-vinyl lactam) component is combined with a substance which forms a complex therewith prior to, during, or subsequent to fabrication of the blend.

17. The polymer blend of claim 1 containing up to 20 weight percent of one or a mixture of compatible or compatibilized polymers.

18. The polymer blend of claim 1 containing one or more additional ingredients.

19. The polymer blend of claim 18 in which the additional ingredient is one which is releasable from the polymer blend.

20. The polymer blend of claim 19 in which the releasable material is a bio-effecting or body treating material.

* * * * *